(12) United States Patent
Mizuno et al.

(10) Patent No.: US 9,073,480 B2
(45) Date of Patent: Jul. 7, 2015

(54) TURNING DIRECTION INDICATOR

(71) Applicant: YAZAKI CORPORATION, Tokyo (JP)

(72) Inventors: Yoshiyuki Mizuno, Makinohara (JP); Hidehiro Akahori, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 14/547,664

(22) Filed: Nov. 19, 2014

(65) Prior Publication Data

US 2015/0073665 A1 Mar. 12, 2015

Related U.S. Application Data

(63) Continuation of application No. PCT/JP2013/069836, filed on Jul. 22, 2013.

(30) Foreign Application Priority Data

Jul. 23, 2012 (JP) .................................. 2012-162969

(51) Int. Cl.
*B60Q 1/40* (2006.01)
*B60Q 1/34* (2006.01)
(Continued)

(52) U.S. Cl.
CPC .............. *B60Q 1/346* (2013.01); *B60Q 1/343* (2013.01); *B60Q 1/34* (2013.01); *B60Q 1/425* (2013.01); *G07C 5/04* (2013.01); *G07C 5/06* (2013.01)

(58) Field of Classification Search
USPC .......... 701/41; 200/61.27, 61.3, 61.35, 61.31, 200/61.38; 315/81, 77; 250/231.14, 231.18; 340/465, 475–476; 73/488
See application file for complete search history.

(56) References Cited

U.S. PATENT DOCUMENTS 4,638,290 A * 1/1987 Wagner ......................... 340/476
5,614,884 A * 3/1997 Evans ........................... 340/477
(Continued)

FOREIGN PATENT DOCUMENTS

JP 63-002750 A 1/1988
JP 06-032170 A 2/1994
(Continued)

OTHER PUBLICATIONS

Technical overview on designing wireless remote control steering mechanisms for small ships and scaled model ships; Barbos, M.; Cristescu, C.; Automation, Quality and Testing, Robotics, 2008. AQTR 2008. IEEE International Conference on; vol. 3; DOI: 10.1109/AQTR.2008.4588929; Publication Year: 2008, pp. 287-291.*

(Continued)

*Primary Examiner* — Cuong H Nguyen
(74) *Attorney, Agent, or Firm* — Sughrue Mion, PLLC

(57) ABSTRACT

In a turning direction indicator, a count section which counts a number of rotations in a case where an indication operation section is operated to a position indicating one turning direction and the one turning direction is displayed and where the steering wheel is rotated one time or more in the one turning direction. The counted number of rotations is stored. A determination section determines whether the stored value is a predetermined value indicating that the number of rotations is 0 in a case where the steering wheel is operated in the one turning direction and thereafter operated in another turning direction and where the steering angle becomes a predetermined angle or less. A cancellation section does not cancel display of the turning direction if the stored value is determined as being not the predetermined value, and otherwise cancels the display of the turning direction.

4 Claims, 6 Drawing Sheets

(51) Int. Cl.
  *B60Q 1/42*  (2006.01)
  *G07C 5/04*  (2006.01)
  *G07C 5/06*  (2006.01)

(56) References Cited

U.S. PATENT DOCUMENTS

| | | | | |
|---|---|---|---|---|
| 5,646,590 | A | * | 7/1997 | Dembicks .................... 340/475 |
| 6,155,106 | A | * | 12/2000 | Sano .......................... 73/117.02 |
| 7,102,500 | B2 | * | 9/2006 | Martin et al. ................. 340/477 |
| 8,791,637 | B2 | * | 7/2014 | Shimizu et al. ................. 315/81 |
| 2008/0035411 | A1 | * | 2/2008 | Yamashita et al. ............ 180/443 |
| 2008/0202900 | A1 | * | 8/2008 | Sugino et al. .............. 200/61.34 |
| 2009/0093930 | A1 | * | 4/2009 | Hatano et al. ..................... 701/41 |
| 2010/0156621 | A1 | * | 6/2010 | Nishimura .................... 340/476 |
| 2010/0219051 | A1 | * | 9/2010 | Shimizu et al. ............ 200/61.27 |
| 2010/0308988 | A1 | * | 12/2010 | Ieda et al. ..................... 340/477 |
| 2012/0035810 | A1 | * | 2/2012 | Mukai et al. ..................... 701/41 |

FOREIGN PATENT DOCUMENTS

| | | |
|---|---|---|
| JP | 11-070833 A | 3/1999 |
| JP | 2006-117047 A | 5/2006 |
| JP | 2008-260363 A | 10/2008 |
| JP | 2009-248576 A | 10/2009 |
| JP | 2010-201982 A | 9/2010 |
| JP | 4793312 B2 | 10/2011 |
| WO | WO2007/105772 * | 9/2007 |

OTHER PUBLICATIONS

Introduction on dynamic motion of opposite and parallel steering for electric vehicle; Ishak, M.I. ; Ogino, H. ; Oshinoya, Y.; Systems, Process & Control (ICSPC), 2013 IEEE Conference on; DOI: 10.1109/SPC.2013.6735106; Publication Year: 2013 , pp. 73-78.*

Study on fail-safe strategy of electric power steering system; Lianbing Li ; Bingshan Liu ; Guowei Zhao ; Hexu Sun; Mechatronics and Automation, 2009. ICMA 2009. International Conference on; DOI: 10.1109/ICMA.2009.5246451; Publication Year: 2009 , pp. 4775-4779.*

Dual-Driver Networked Fire Truck Simulator with Multimodal Display including Force Feedback Steering and Rotating Motion Platform; Nagai, T. ; Cohen, Michael ; Moriguchi, Y. ; Murakami, Y.; Enabling Technologies: Infrastructure for Collaborative Enterprises, 2007. WETICE 2007. 16th IEEE International Workshops on; DOI: 10.1109/WETICE.2007.4407202.*

Preliminary Report dated Jan. 27, 2015, issued by the International Searching Authority in counterpart International Application No. PCT/JP2013/069836.

Search Report dated Oct. 8, 2013, issued by the International Searching Authority in counterpart International Application No. PCT/JP2013/069836.

Written Opinion dated Oct. 8, 2013, issued by the International Searching Authority in counterpart International Application No. PCT/JP2013/069836.

* cited by examiner

TURNING DIRECTION INDICATOR

CROSS REFERENCE TO RELATED APPLICATIONS

This application is a continuation of PCT application No. PCT/JP2013/069836, which was filed on Jul. 22, 2013 based on Japanese Patent Application (No. 2012-162969) filed on Jul. 23, 2012, the contents of which are incorporated herein by reference.

BACKGROUND OF THE INVENTION

1. Field of the Invention

The present invention relates to a turning direction indicator which indicates the turning direction of a vehicle.

2. Description of the Related Art

Conventionally, some of operation levers for mechanically turning ON/OFF a turn signal switch include a self-canceling mechanism. In an operation lever having a self-canceling mechanism, when a steering wheel is rotated, the operation lever is returned to a neutral (N) position. Specifically, a cancel cam which is rotatably supported on a steering shaft is rotated following the rotation of the steering wheel, and a cancel pin is rotated. Then, the cancel pin drives a ratchet is attached to a rotatable shaft, and the operation lever is returned from a right turn (R) position or a left turn (L) position to the N position.

Also some of operation levers for turning ON and OFF a turn signal switch in an electronic control manner are of a self-canceling type. In the case of an operation lever of this type, the cancellation timing is identical with that in an operation lever which mechanically operates a turn signal switch.

Among turn signal switches, there are those in which an arbitrary steering angle is detected by a steering angle sensor or the like, and a signal is output. In a momentary type turn signal switch which is switched ON during a period when the switch is operated by an operation lever, a technique in which a turn signal is turned OFF by an electronic control is known.

JP-A-H06-032170 describes the prior art of this type. JP-A-H06-032170 discloses a technique in which a delay operation of maintaining lighting states of a turning indicator and a cornering lamp is performed for several seconds after an operation switch is returned from the operation state to the neutral point. JP-A-H06-032170 further discloses that, when the operation switch is returned by a driver's operation, the delay operation is inhibited.

JP-A-2010-201982 discloses a turn signal device in which, after lighting of a turn signal is performed, monitors the degree of a temporal change of the rotational direction of a steering wheel. When it is detected that, after the steering wheel is once rotated in the direction indicated by a turn signal, the steering wheel is rotated in the opposite direction, and then rotated in the direction indicated by the turn signal, the turn signal device turns OFF the turn signal.

JP-A-2006-117047 discloses a turn direction indicating device in which, when a lever is swung to a middle position B or D, the lever is automatically returned to a neutral position A, and a driving signal is supplied to a lighting device for a predetermined time period. In the turn direction indicating device, in the case of a lane change or the like, a turn signal lamp blinks only for the predetermined time period.

JP-B-4793312 discloses a configuration where, when a lever is swung to a neutral position, a lighting device performs a blinking operation, and stops the operation after a predetermined number of blinking intervals. According to the configuration, even when the hand is immediately released from the lever to cause the lever to be automatically returned to the neutral position, the blinking operation is surely performed.

SUMMARY OF THE INVENTION

However, the above-described related-art turning direction indicators have the following problems. In the case where a steering wheel is rotated one time or more in an acute intersection where two roads cross each other (for example, an intersection where the steering wheel must be operated so as to make K-turn close to U-turn), there is a possibility that the operation of returning the steering wheel causes the self-canceling operation to be performed in the middle of a right or left turn, and the display of the turn signal is turned OFF. Such a situation occurs because, in the case of a mechanical turn signal SW lever (operation lever), a steering angle functioning as a cancel angle exists also at a position (cancel angle $\alpha+n$ rotations×360 degrees) where the steering wheel makes one or more rotations, in addition to the cancel angle $\alpha$ which is within one rotation of the steering wheel.

When a self-canceling operation occurs during the course, therefore, the driver again operates the operation lever. As a result, the steering operation is cumbersome, and this leads to reduction of safety. In the viewpoint of a following vehicle, the display of the turn signal disappears during the course, and this causes confusion.

On the other hand, a configuration where an operation lever is held for a predetermined time period (long press) in order to prevent a self-canceling operation from being performed during a steering operation of one or more rotations, and that where a pressure sensor is used and a pressure having a given value or higher is applied have been studies. However, these configurations require an incidental operation to be performed by the driver or an additional function.

The invention has been made in view of the above-discussed circumstances, and an object thereof is to provide a turning direction indicator in which, even when a steering wheel is rotated one time or more, display of the turning direction is not canceled in the middle of a right or left turn.

In order to accomplish the object, the turning direction indicator of the invention is characterized in following (1) to (4).

(1) A turning direction indicator which indicates a turning direction of a vehicle, including:

an indication operation section which is operated from a neutral position to a position indicating the turning direction, thereby switching display of the turning direction to an ON state;

a display section which, when the display of the turning direction is switched to the ON state by the indication operation section, displays the turning direction;

a steering angle detection section which detects a steering angle of a steering wheel that is operated for changing a course of the vehicle;

a count section which counts a number of rotations in a case where the indication operation section is operated to a position indicating one turning direction and the one turning direction is displayed by the display section, and also in a case where the steering wheel is rotated one time or more in the one turning direction;

a storage section which stores the number of rotations that is counted by the count section;

a determination section which determines whether the stored value stored in the storage section is a predetermined value indicating that the number of rotations has a value of 0 or not in a case where the steering wheel is operated in the one turning direction and thereafter the steering wheel is operated in another turning direction that is opposite to the one turning direction, and also in a case where the steering angle detected by the steering angle detection section becomes equal to or smaller than a magnitude of a predetermined angle; and a cancellation section which does not cancel the display of the turning direction if the determination section determines that the stored value is not the predetermined value, and which cancels the display of the turning direction if determined that the stored value is the predetermined value.

(2) The turning direction indicator having the configuration of (1) above, wherein the determination section determines whether the stored value stored in the storage section is the predetermined value indicating that the number of rotations has a value of 0 or not in a case where the steering wheel is operated in the one turning direction and the steering angel detected by the steering angle detection section becomes equal to or larger than a first angle and thereafter the steering wheel is operated in the other turning direction, and also in a case where the steering angle becomes equal to or smaller than a second angle that is smaller than the first angle, and wherein if the determination section determines that the stored value is not the predetermined value, the cancellation section does not cancel the display of the turning direction, and decrements the stored value in accordance with a number of rotations in the other turning direction.

(3) The turning direction indicator having the configuration of (2) above, wherein when the steering angle detected by the steering angle detection section is a cancel angle, the indication operation section is automatically returned to the neutral position, and wherein the first angle is a rotation angle which is larger than the cancel angle, and the second angle is a rotation angle which is smaller than the cancel angle.

(4) The turning direction indicator having the configuration of any one of (1) to (3) above, wherein in a case where a center position of the steering wheel is a value of 0 and in a case where the steering wheel is at an rotation angle in a right turning direction and a left turning direction, the steering angle detection section detects the steering angle of the steering wheel as values which are different in their positive and negative signs.

According to the turning direction indicators having the configurations of (1) to (4) above, in the case where the steering wheel is operated in the one turning direction and thereafter the steering wheel is rotated in the other turning direction, and in the case where the steering angle becomes equal to or smaller than the predetermined angle, the display of the turning direction is not canceled if the number of rotations does not have a value of 0, and the display of the turning direction is canceled if the number of rotations has a value of 0.

According to the invention, in the case where the steering wheel is operated in the one turning direction and thereafter the steering wheel is rotated in the other turning direction, and in the case where the steering angle becomes equal to or smaller than the predetermined angle, the display of the turning direction is not canceled if the number of rotations does not have a value of 0, and the display of the turning direction is canceled if the number of rotations has a value of 0. Therefore, even in the case where the steering wheel is rotated one time or more, the display of the turning direction is not canceled in the middle of a right or left turn. Consequently, botheration of again operating the indication operation section can be eliminated. As a result, driving safety can be ensured.

In the above, the invention has been briefly described. When a mode for carrying out the invention (hereinafter, referred to as "embodiment") which will be described below is through read with reference to the accompanying drawings, a detail of the invention will be further clarified.

DETAILED DESCRIPTION OF THE EXEMPLARY EMBODIMENTS

Figure 1:
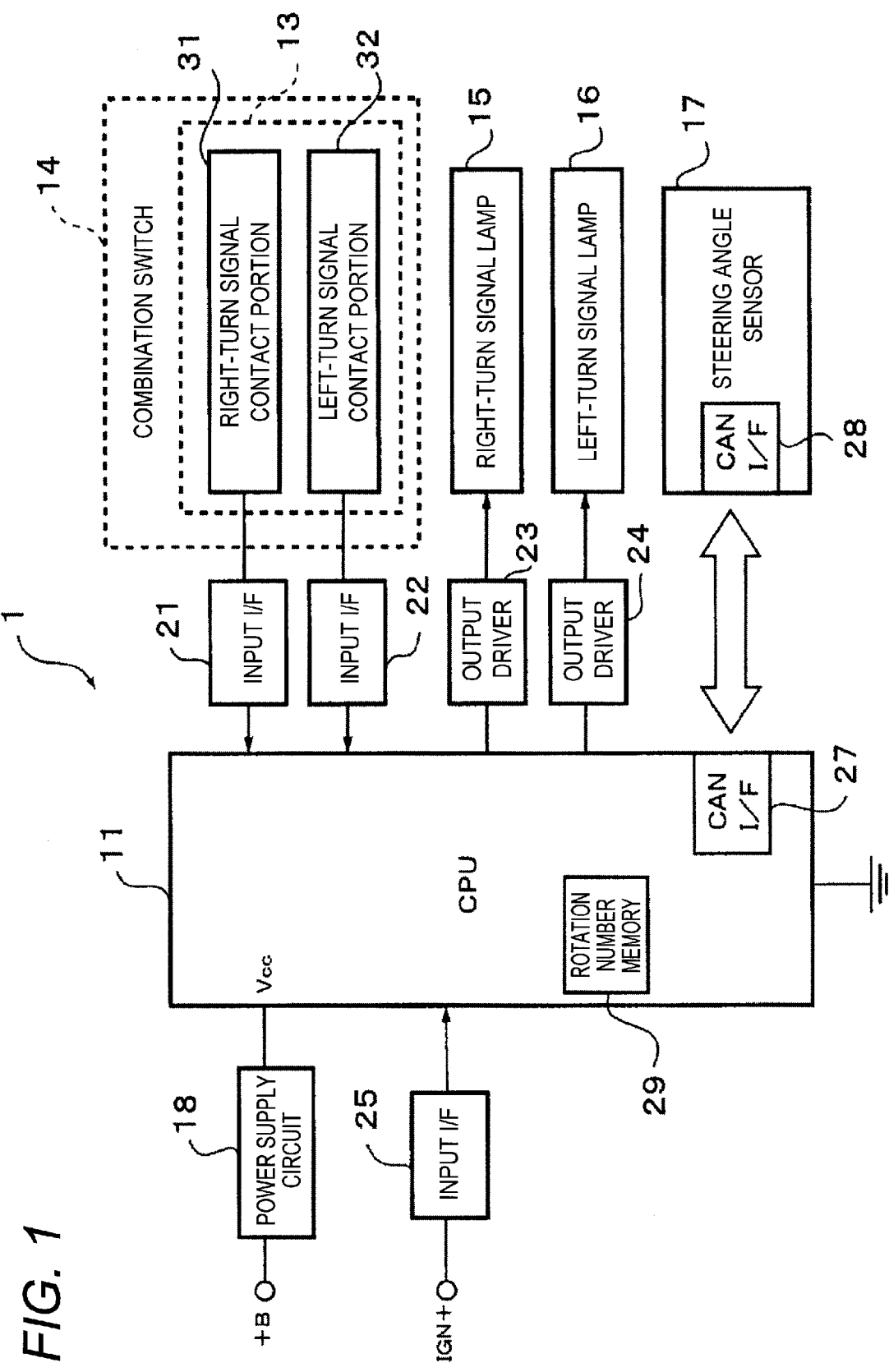
FIG. 1 is a view showing the configuration of a turning direction indicator 1 of an embodiment of the invention.

A turning direction indicator of an embodiment of the invention will be described with reference to the drawings. FIG. 1 is a view showing the configuration of the turning direction indicator 1 of the embodiment of the invention. The turning direction indicator 1 is of the electronic control type, and includes a CPU 11, a combination switch 14, a right-turn signal lamp 15, a left-turn signal lamp 16, and a steering angle sensor 17.

The combination switch 14 has a turn signal switch 13. The turn signal switch 13 is switched ON by an operation lever 43 which is vertically swingable about a steering shaft 42 (see FIGS. 2 to 3C).

The operation lever 43 is operated by the driver from a neutral (N) position to a right turn (R) position or a left turn (L) position. Thereafter, the lever is returned to the neutral position (N position) by rotation of the steering shaft 42.

The turn signal switch 13 has a right-turn signal contact portion 31 and a left-turn signal contact portion 32. The right-turn signal contact portion 31 is connected to the CPU 11 through an input I/F 21. The left-turn signal contact portion 32 is connected to the CPU 11 through an input I/F 22. When the driver lowers the operation lever 43 to the R position, the right-turn signal contact portion 31 is turned ON. When the driver raises the operation lever 43 to the L position, the left-turn signal contact portion 32 is turned ON.

The right-turn signal lamp 15 is driven by an output driver 23 connected to the CPU 11, and blinks or goes off based on a control signal supplied from the output driver 23. The left-turn signal lamp 16 is driven by an output driver 24 connected to the CPU 11, and blinks or goes off based on a control signal supplied from the output driver 24. The right-turn signal lamp 15 and the left-turn signal lamp 16 correspond to the display section.

The steering angle sensor 17 (steering angle detection section) is disposed on the steering shaft 42 (see FIG. 2), and the absolute steering angle, i.e., the center position of a steering wheel 41 is set to the center or 0 degrees. Moreover, the steering angle sensor 17 can detect a right rotation (minus) steering angle and the left rotation (plus) steering wheel, as values of respective different signs. Furthermore, the steering angle sensor 17 incorporates a CAN (Controller Area Network) I/F 28. The CPU 11 incorporates a CAN I/F 27, and transmits and receives signals to and from the steering angle sensor 17 via the CAN I/F 28 incorporated in the steering angle sensor 17.

The CPU 11 incorporates a rotation number memory 29 (storage section) which stores the number of rotations n (stored value) of the steering wheel. Each time when the steering angle detected by the steering angle sensor 17 is rotated one time in the left of right direction, the number of rotations n stored in the rotation number memory 29 is incremented by a plus (+) value of 1, or decremented by a minus (−) value of 1.

The CPU 11 receives the following signals. Namely, an R-position signal supplied from the right-turn signal contact portion 31 via the input I/F 21, an L-position signal supplied from the left-turn signal contact portion 32, and a steering angle signal which is detected by the steering angle sensor 17 via the CAN I/F 27 are input to the CPU. Based on these input signals and the number of rotations n stored in the rotation number memory 29, the CPU 11 performs a control for stopping the blinking of the right-turn signal lamp 15 and the left-turn signal lamp 16 in accordance with a control program which will be described later.

Moreover, an ignition (IGN) SW is connected to the CPU 11 via an input I/F 25. Furthermore, the CPU 11 is powered by a power supply circuit 18 connected to a battery (+B).

Figure 2:
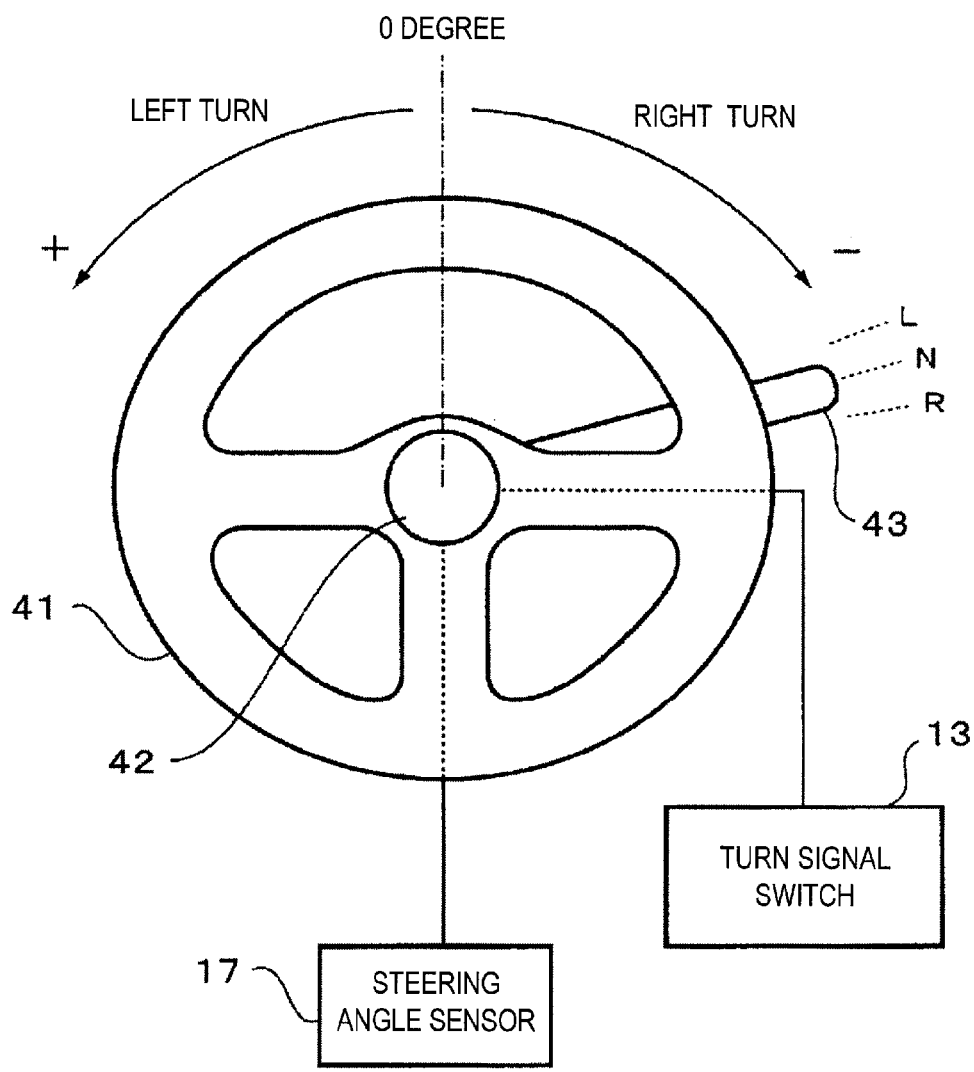
FIG. 2 is a view showing the rotational direction of a steering wheel 41.

FIG. 2 is a view showing the rotational direction of the steering wheel 41. The steering angle sensor 17 is attached to the steering shaft 42. In the steering angle sensor 17, as described above, the center position is set to the center 0 degrees of the steering angle, angles (steering angles) of left/right rotations are detected as plus/minus angles, respectively, and signals of the angles are output. Here, it is assumed that, when the steering wheel 41 is right-rotated, a minus angle is detected, and, when the steering wheel 41 is left-rotated, a plus steering angle is detected. Furthermore, it is assumed that the rotational direction is indicated by the plus/minus, and the magnitude of the angle is indicated by an absolute value.

Figure 3A:
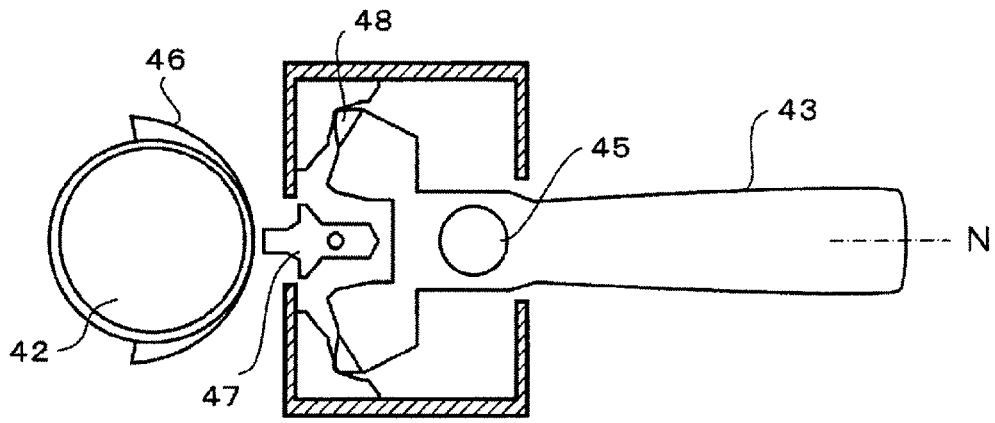
FIGS. 3A to 3C are views illustrating a self-canceling operation of an operation lever 43.
Figure 3B:
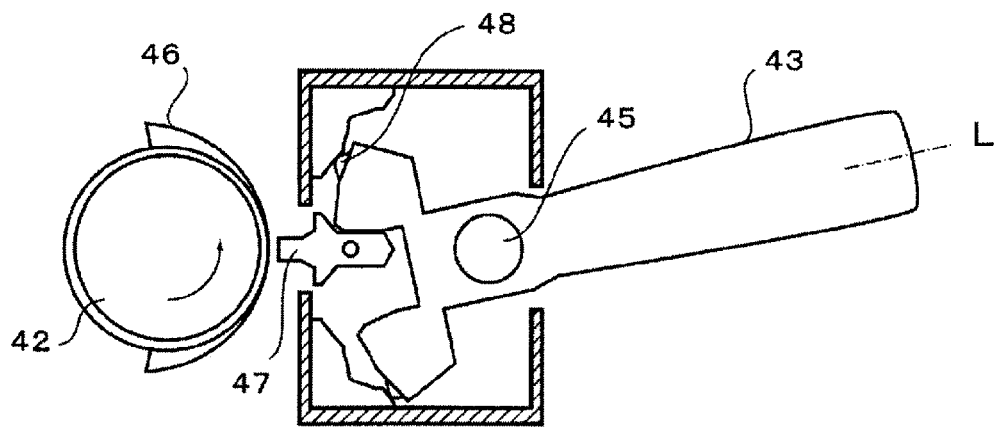
Figure 3C:
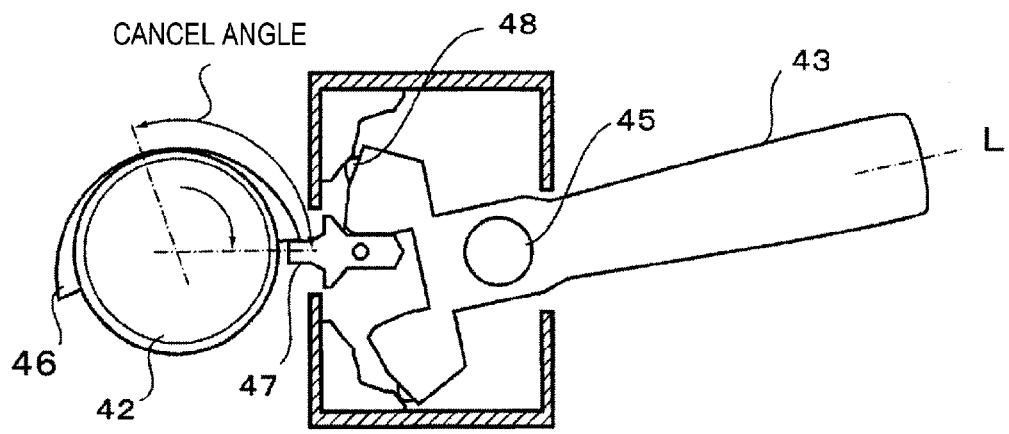

FIGS. 3A to 3C are views illustrating a self-canceling operation of the operation lever 43. The operation lever 43 is swingable about a movable shaft 45. The operation lever 43 has a ratchet mechanism 48 in an end portion on the side of the steering wheel. When the operation lever 43 is swung to the R position or the L position, the operation lever 43 maintains the position.

On the other hand, a cancel cam 46 is rotatably supported on the steering shaft 42. When, after the steering shaft 42 is rotated by operating the steering wheel to an angle which exceeds the cancel angle (see FIG. 3C), the steering shaft is rotated in the opposite direction, the cancel cam 46 presses a cancel pin 47, whereby the cancel pin 47 is swung. The swing of the cancel pin 47 causes the ratchet mechanism 48 to be released, and the operation lever 43 is returned to the neutral (N) position.

As described above, when the operation lever 43 is operated from the neutral (N) position to the right turn (R) position or the left turn (L) position, and then the ratchet mechanism 48 is released by the cancel cam 46 which is rotatably supported on the steering shaft 42, the operation lever is returned to the neutral position (N position). The cancel angle varies depending on the vehicle type (a truck, a passenger vehicle) or the like, and is set to an arbitrary value such as 130 degrees or 40 degrees.

The operation of the turning direction indicator 1 having the above-described configuration will be described. When the driver lowers the operation lever 43 to the right turn (R) position, and the right-turn signal contact portion 31 is turned ON, as described above, the right-turn signal lamp 15 blinks. When the driver raises the operation lever 43 to the left turn (L) position, and the left-turn signal contact portion 32 is turned ON, similarly, the left-turn signal lamp 16 blinks.

In the embodiment, a case is assumed where a right or left turn is made by rotating the steering wheel one time or more in an acute intersection where two roads cross each other (for example, an intersection where the steering wheel must be operated so as to make K-turn close to U-turn). A self-canceling operation of, in a state where the right-turn signal lamp 15 or the left-turn signal lamp 16 blinks in such a case, stopping (extinguishing) the blinking at an adequate timing will be described.

As described above, the cancel angle can be arbitrarily set. Here, +40 degrees of the steering angle of the steering wheel 41 is set as the cancel angle.

Figure 4:
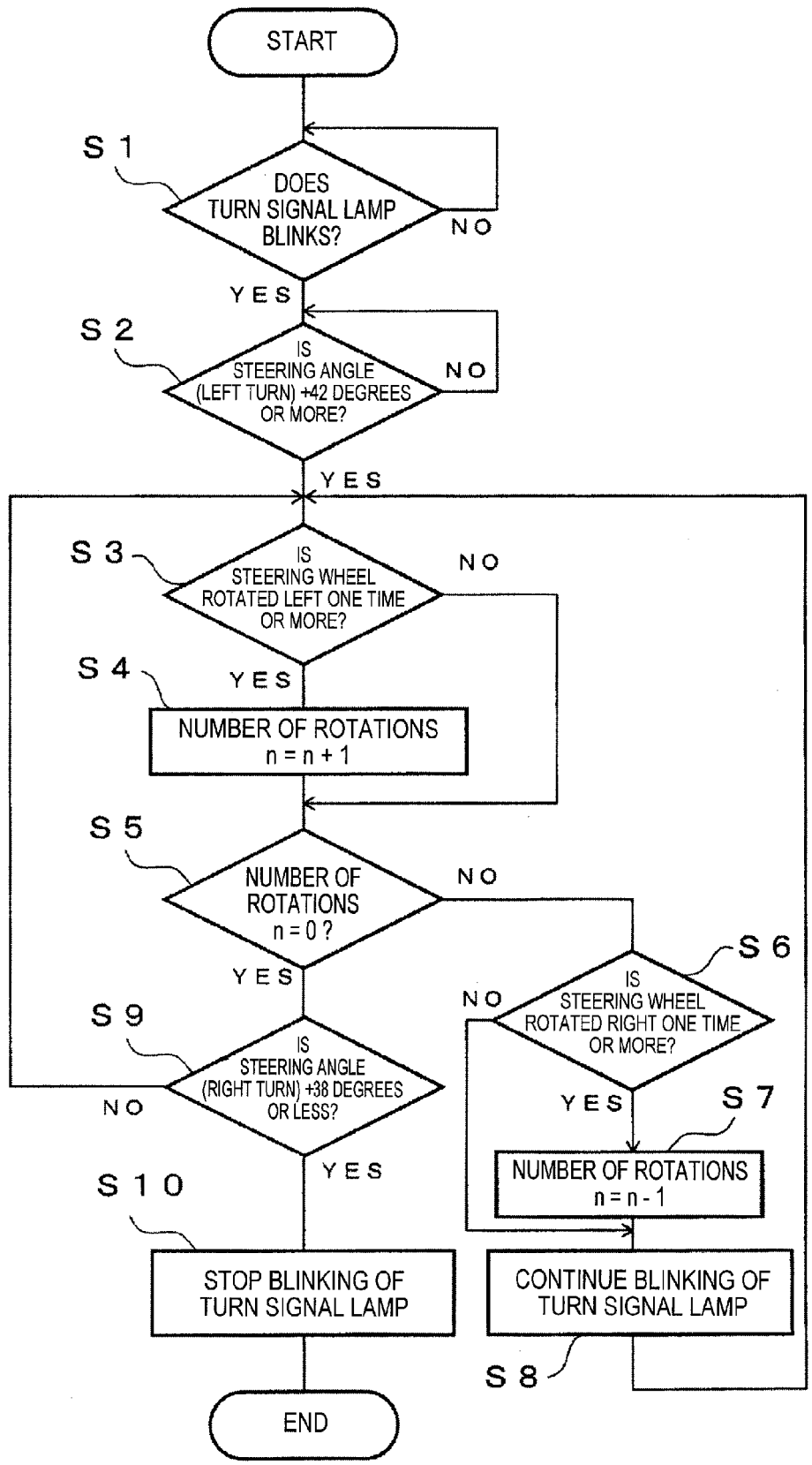
FIG. 4 is a flowchart showing the procedure of an operation of self-canceling a turn signal in the turning direction indicator 1 of the embodiment of the invention.

FIG. 4 is a flowchart showing the procedure of the operation of self-canceling the turn signal in the turning direction indicator 1 of the embodiment of the invention. The control program is stored in a ROM (not shown) of the CPU 11, and executed by the CPU 11.

Here, a case where a left turn is made by rotating the steering wheel one time or more will be described. A similar procedure is performed also in a case where a right turn is made by rotating the steering wheel one time or more. FIGS. 5A to 5E are views showing a locus of a vehicle 50 in the case where the steering wheel is rotated one time or more and a left turn is made.

Figure 5A:
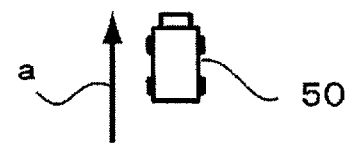
FIGS. 5A to 5E are views showing a locus of a vehicle 50 in the case where the steering wheel is rotated one time or more and a left turn is made.

First, the CPU 11 waits until the operation lever 43 is operated to the left turn (L) position by the driver. In this way, the CPU 11 waits until the left-turn signal lamp 16 blinks (step S1). In this state, the vehicle 50 is on a straight course a as shown in FIG. 5A.

Figure 5B:
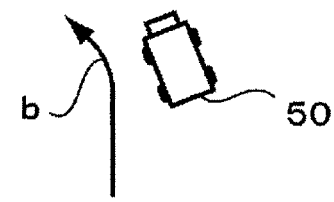

When the left-turn signal lamp 16 starts to blink, the CPU 11 waits until the steering angle detected by the steering angle sensor 17 is increased from an angle of 0 corresponding to the center position to a preliminary angle (+42 degrees) which is larger than the cancel angle (+40 degrees) by 2 degrees, or more (step S2). The preliminary angle (+42 degrees) corresponds to the first angle. When the steering wheel 41 operated by the driver is rotated in the left direction, the vehicle 50 starts to turn in the left direction, and a course b of the vehicle 50 starts to bend in the left direction as shown in FIG. 5B.

Figure 5C:
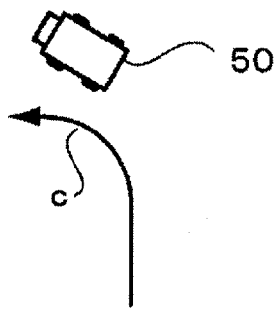

When the steering angle is equal to or larger than the preliminary angle (+42 degrees), the CPU 11 determines whether the steering wheel is rotated one time in the left direction by the driver's operation or not, based on the steering angle signal detected by the steering angle sensor 17 (step S3). If the steering wheel is not rotated one time, the CPU 11 advances to a process of step S5. In the case where the rotation of the steering wheel is less than one time, the vehicle 50 further turns in the left direction, and a course c of the vehicle 50 further bends in the left direction as shown in FIG. 5C.

Figure 5D:
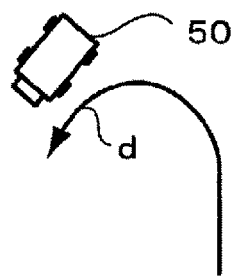

By contrast, if, in step S3, the steering wheel is rotated one time in the left direction, the CPU 11 increments by a value of 1 the number of rotations n stored in the rotation number memory 29 (step S4). The process of step S4 corresponds to the count section. In the case where the steering wheel is rotated one time in the left direction, the vehicle 50 further turns in the left direction, and a course d of the vehicle 50 further bends in the left direction as shown in FIG. 5D.

Then, the CPU 11 determines whether the number of rotations n stored in the rotation number memory 29 has a value of 0 (predetermined value) or not (step S5). The process of step S5 corresponds to the determination section. Immediately after the steering wheel is rotated one time in the left direction, the number of rotations n is larger than 1, and therefore the CPU advances to the process of step S6. Thereafter, the CPU 11 determines whether the steering wheel is right-rotated one time by the driver or not, based on the steering angle signal detected by the steering angle sensor 17 (step S6). If the steering wheel is being rotated in the left direction, the CPU advances to the process of step S8. Then, the CPU 11 continues the blinking of the left-turn signal lamp 16 (step S8).

In this way, during the left rotation of the steering wheel, the CPU 11 repeatedly executes the processes of steps S3, S4, S5, S6, and S8. Each time when the number of rotations in the left direction is increased, the number of rotations n is incremented. During the processes concerned are continued, the CPU 11 continues the blinking of the left-turn signal lamp 16.

By contrast, when the steering wheel starts to be rotated in the right direction, the CPU 11 determines whether the steering wheel is rotated one time in the right direction by the driver's operation or not, based on the steering angle signal detected by the steering angle sensor 17 (step S6). If, in step S6, the steering wheel is rotated one time in the right direction, the CPU 11 decrements by a value of 1 the number of rotations n stored in the rotation number memory 29 (step S7). Then, the CPU 11 returns to step S5 through steps S8, S3, and S4, and determines whether the number of rotations n stored in the rotation number memory 29 has a value of 0 (predetermined value) or not. If the number of rotations n does not have a value of 0, it can be determined that the steering wheel just starts to be rotated in the right direction, and the steering angle is still within the left rotation angle. Therefore, the CPU 11 again determines whether the steering wheel is rotated one time in the right direction by the driver's operation or not (step S6). If the steering wheel is rotated one time, the number of rotations n is decremented by a value of 1 (step S7), and the blinking of the left-turn signal lamp 16 is continued (step S8). Thereafter, the CPU 11 returns to the process of step S5 to again determine whether the number of rotations n stored in the rotation number memory 29 has a value of 0 (predetermined value) or not.

In this way, during the right rotation of the steering wheel, the CPU 11 repeatedly executes the processes of steps S6, S7, S8, S3, and S5. Each time when the number of rotations in the right direction is decreased, the number of rotations n is decremented. During the processes concerned are continued, the CPU 11 continues the blinking of the left-turn signal lamp 16.

Figure 5E:
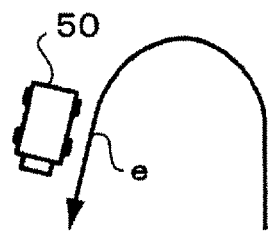

If, in step S5, the number of rotations n has a value of 0, the CPU 11 determines whether, as a result that the steering wheel is operated by the driver in the direction retuning to the original (right direction), the steering angle detected by the steering angle sensor 17 is returned to a preliminary angle (+38 degrees) which is smaller than the cancel angle by 2 degrees or less (step S9). The preliminary angle (+38 degrees) corresponds to the second angle. If not returned to the preliminary angle (+38 degrees) or less, the CPU 11 returns to the process of step S3. If, in step S9, the steering angle is returned to the preliminary angle (+38 degrees) or less, the CPU 11 stops the blinking of the left-turn signal lamp 16 (step S10). The process of step S10 corresponds to the cancellation section. If the number of rotations n has a value of 0, and the steering angle is returned to the preliminary angle (+38 degrees) or less, a course e of the vehicle 50 is returned to straight travel as shown in FIG. 5E. Thereafter, the CPU 11 terminates the operation.

Figure 6:
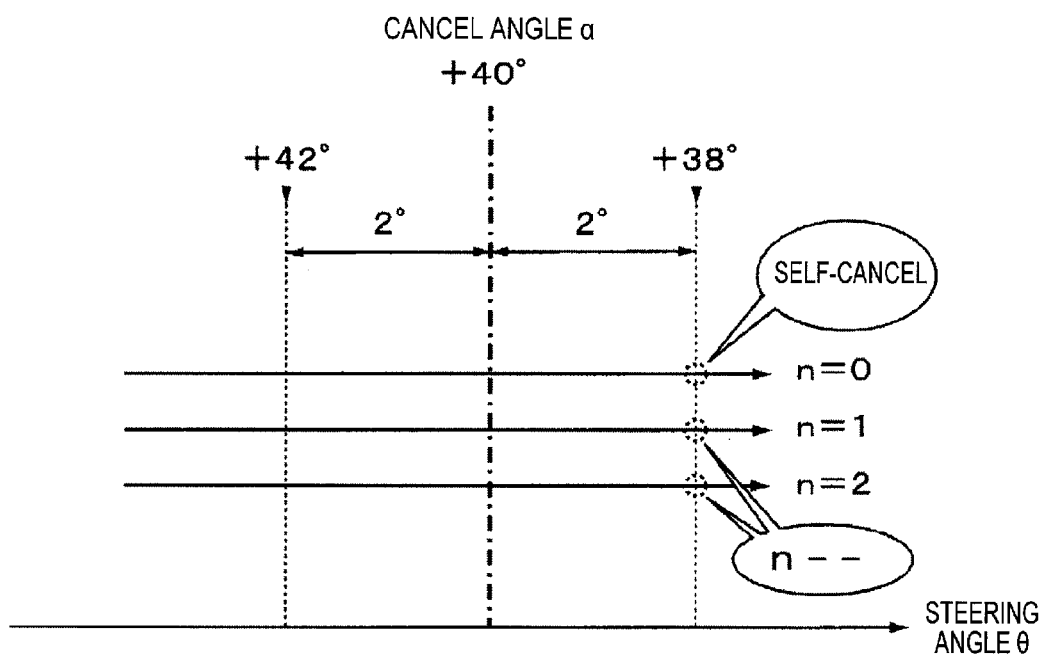
FIG. 6 is a view illustrating a timing of the self-canceling operation by the turning direction indicator 1 of the embodiment of the invention.

FIG. 6 is a view illustrating a timing of the self-canceling operation by the turning direction indicator 1 of the embodiment of the invention. In the case where, after the steering angle θ detected during the left turn is equal to or larger than the preliminary angle (+42 degrees) which is larger than the cancel angle α (+40 degrees) by 2 degrees, the steering angle θ detected during returning to the original is equal to or smaller than the preliminary angle (+38 degrees), when the number of rotations n has a value of 0, the turning direction indicator 1 performs the self-canceling operation. By contrast, when the number of rotations n has a value of 1 or more, the number of rotations n is decremented by a value of 1, and the turning direction indicator 1 continues the blinking of the left-turn signal lamp 16.

Similarly, in the case where, after the steering angle θ detected during the right turn is equal to or larger than a preliminary angle (−42 degrees) which is larger than a cancel angle α (−40 degrees) by 2 degrees, the steering angle θ detected during returning to the original is equal to or smaller than a preliminary angle (−38 degrees), when the number of rotations n has a value of 0, the turning direction indicator 1 performs the self-canceling operation. By contrast, when the number of rotations n has a value of 1 or more, the number of rotations n is decremented by a value of 1, and the turning direction indicator 1 continues the blinking of the right-turn signal lamp 15.

According to the turning direction indicator of the embodiment, even when the steering wheel is rotated one time or more, blinking of a turn signal lamp is not stopped in the middle of a right or left turn. Therefore, botheration of again operating the operation lever can be eliminated. Moreover, the driver is prevented from simultaneously performing two operations, i.e., a steering operation and a lever operation, and therefore driving safety can be ensured.

Moreover, according to the turning direction indicator of the embodiment, in the case where, after the steering angle is the preliminary angle (+42 degrees) or more, the steering angle is the preliminary angle (+38 degrees) or less, the number of rotations stored in the rotation number memory is decremented, or blinking is stopped. Therefore, blinking of a turn signal lamp can be stopped at an adequate timing.

Furthermore, according to the turning direction indicator of the embodiment, the preliminary angles in step S2 and S5 are rotation angles which are slightly larger and smaller than the cancel angle that causes the operation lever to be automatically returned, respectively. Therefore, the stopping of blinking of a turn signal lamp, and the returning of the operation lever to the neutral position can be synchronized with each other.

Furthermore, according to the turning direction indicator of the embodiment, in the case where the steering wheel is at the center position, in the steering sensor, the steering angle of the steering wheel is set to a value of 0. Furthermore, in the case where the steering wheel is at a rotation angle in the left turning direction, the steering angle sensor detects a plus value, and, in the case where the steering wheel is at a rotation angle in the right turning direction, the steering angle sensor detects a minus value. Therefore, a process dealing with the steering angle is simplified.

The invention is not limited to the configuration of the above-described embodiment, and is applicable to any configuration as far as it can attain the functions of the configuration of the embodiment.

In the embodiment, for example, the preliminary angle is set to a value which is larger by 2 degrees than the cancel angle (+40 degrees). The preliminary angle is not limited to this. The preliminary angle can be changed to a value which is larger by 3 degrees or more. The preliminary angle may be set to different values depending on whether the turning direction is the left turning direction or the right turning direction.

In the embodiment, the number of rotations n of the steering wheel is stored as a stored value. Alternatively, the storage may be performed by setting/resetting flags each indicating that the number of rotations has a value of 1, a value of 2, . . . . Instead that the number of rotations n of the steering wheel is started from a value of 0 as the initial value, the number of rotations may be started from an arbitrary value.

In the invention, as described above, even when the steering wheel is rotated one time or more during indication of the turning direction of the vehicle, display of the turning direction is not canceled in the middle of a right or left turn. Therefore, botheration of again operating the indication operation section can be eliminated. As a result, driving safety can be ensured.

Features of the above-described embodiment of the turning direction indicator of the invention are listed in [1] to [4] below in a brief and summarized manner.

[1] The turning direction indicator (1) which indicates a turning direction of a vehicle, including:

an indication operation (operation lever 43) section which is operated from a neutral position to a position indicating the turning direction, thereby switching display of the turning direction to an ON state;

a display section (turn signal lamps 15, 16) which, when the display of the turning direction is switched to the ON state by the indication operation section, displays the turning direction;

a steering angle detection section (steering angle sensor 17) which detects a steering angle of a steering wheel that is operated for changing a course of the vehicle;

a count section (S4) which counts a number of rotations in a case where the indication operation section is operated to a position indicating one turning direction and the one turning direction is displayed by the display section, and also in a case where the steering wheel is rotated one time or more in the one turning direction;

a storage section (rotation number memory 29) which stores the number of rotations that is counted by the count section;

a determination section (S5) which determines whether the stored value stored in the storage section is a predetermined value indicating that the number of rotations has a value of 0 or not in a case where the steering wheel is operated in the one turning direction and thereafter the steering wheel is operated in another turning direction that is opposite to the one turning direction, and also in a case where the steering angle detected by the steering angle detection section becomes equal to or smaller than a magnitude of a predetermined angle; and a cancellation section (S10) which does not cancel the display of the turning direction if the determination section determines that the stored value is not the predetermined value, and which cancels the display of the turning direction if the determination section determines that the stored value is the predetermined value.

[2] The turning direction indicator (1) according to [1], wherein the determination section determines whether the stored value stored in the storage section is the predetermined value indicating that the number of rotations has a value of 0 or not in a case where the steering wheel is operated in the one turning direction and the steering angel detected by the steering angle detection section becomes equal to or larger than a first angle and thereafter the steering wheel is operated in the other turning direction, and also in a case where the steering angle becomes equal to or smaller than a second angle that is smaller than the first angle, and wherein if the determination section determines that the stored value is not the predetermined value, the cancellation section does not cancel the display of the turning direction, and decrements the stored value in accordance with a number of rotations in the other turning direction.

[3] The turning direction indicator (1) according to [2], wherein when the steering angle detected by the steering angle detection section is a cancel angle, the indication operation section is automatically returned to the neutral position, and wherein the first angle is a rotation angle which is larger than the cancel angle, and the second angle is a rotation angle which is smaller than the cancel angle.

[4] The turning direction indicator (1) according to any one of [1] to [3], wherein in a case where a center position of the steering wheel is a value of 0 and in a case where the steering wheel is at an rotation angle in a right turning direction and a left turning direction, the steering angle detection section detects the steering angle of the steering wheel as values which are different in their positive and negative signs.

Although the invention has been described in detail and with reference to the specific embodiment, it is obvious to a person skilled in the art that various changes and modifications can be made without departing from the spirit and scope of the invention.

According to the invention, even in the case where the steering wheel is rotated one time or more, display indication of the turning direction is not canceled in the middle of a right or left turn. Therefore, botheration of again operating the indication operation section can be eliminated. As a result, driving safety can be ensured. The invention which achieves the effects is useful in the field of a turning direction indicator which indicates the turning direction of a vehicle.

What is claimed is:

1. A turning direction indicator which indicates a turning direction of a vehicle, comprising:

an indication operation section which is operated from a neutral position to a position indicating the turning direction, thereby switching display of the turning direction to an ON state;

a display section which, when the display of the turning direction is switched to the ON state by the indication operation section, displays the turning direction;

a steering angle detection section which detects a steering angle of a steering wheel that is operated for changing a course of the vehicle;

a count section which counts a number of rotations in a case where the indication operation section is operated to a position indicating one turning direction and the one turning direction is displayed by the display section and also in a case where the steering wheel is rotated one time or more in the one turning direction;

a storage section which stores the number of rotations that is counted by the count section;

a determination section which determines whether the stored value stored in the storage section is a predetermined value indicating that the number of rotations has a value of 0 or not in a case where the steering wheel is operated in the one turning direction and thereafter the steering wheel is operated in another turning direction that is opposite to the one turning direction, and also in a case where the steering angle detected by the steering angle detection section becomes equal to or smaller than a magnitude of a predetermined angle; and a cancellation section which does not cancel the display of the turning direction if the determination section determines that the stored value is not the predetermined value, and which cancels the display of the turning direction if determined that the stored value is the predetermined value.

2. The turning direction indicator according to claim 1, wherein the determination section determines whether the stored value stored in the storage section is the predetermined value indicating that the number of rotations has a value of 0 or not in a case where the steering wheel is operated in the one turning direction and the steering angel detected by the steering angle detection section becomes equal to or larger than a first angle and thereafter the steering wheel is operated in the other turning direction, and also in a case where the steering angle becomes equal to or smaller than a second angle that is smaller than the first angle, and wherein if the determination section determines that the stored value is not the predetermined value, the cancellation section does not cancel the display of the turning direction, and decrements the stored value in accordance with a number of rotations in the other turning direction.

3. The turning direction indicator according to claim 2, wherein when the steering angle detected by the steering angle detection section is a cancel angle, the indication operation section is automatically returned to the neutral position, and wherein the first angle is a rotation angle which is larger than the cancel angle, and the second angle is a rotation angle which is smaller than the cancel angle.

4. The turning direction indicator according to claim 1, wherein in a case where a center position the steering wheel is a value of 0 and in a case where the steering wheel is at an rotation angle in a right turning direction and a left turning direction, the steering angle detection section detects the steering angle of the steering wheel as values which are different in their positive and negative signs.

* * * * *